Figure 2:
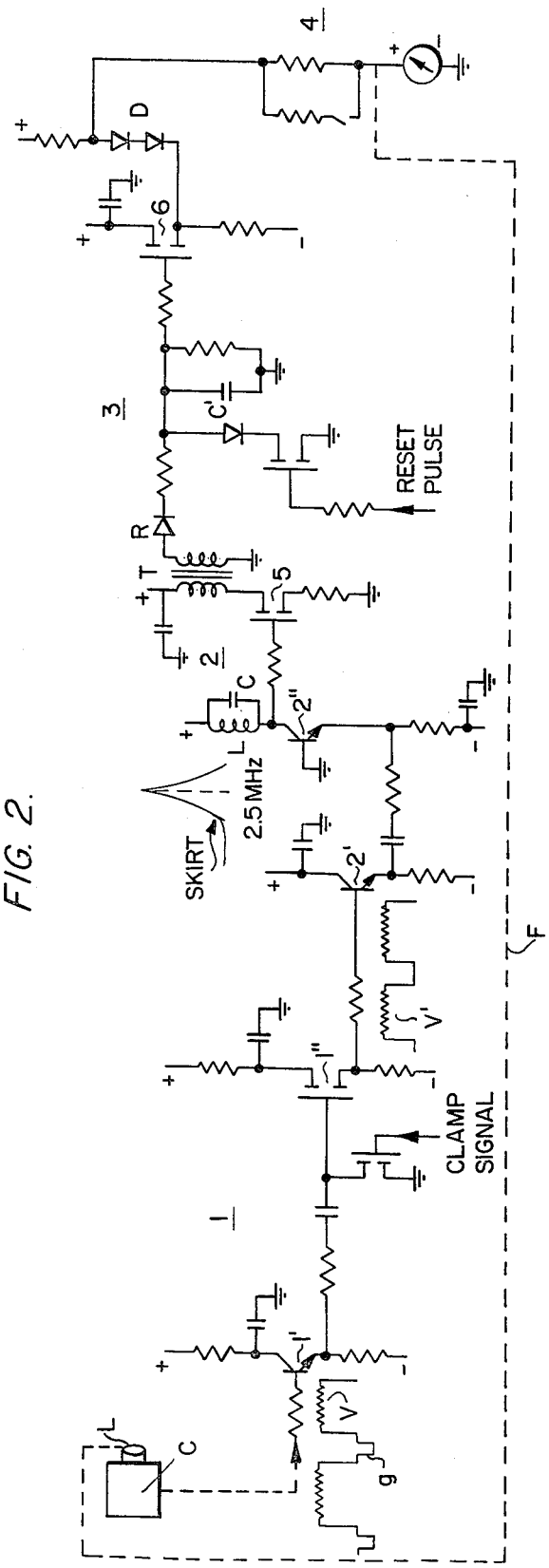

United States Patent [19]

Bishop

[11] Patent Number: 4,484,225
[45] Date of Patent: Nov. 20, 1984

[54] ELECTRONIC FOCUSING METHOD AND APPARATUS FOR TELEVISION PICK-UP CAMERAS AND THE LIKE

[75] Inventor: Robert Bishop, Brookline, Mass.
[73] Assignee: Beltronics, Inc., Brookline, Mass.
[21] Appl. No.: 400,896
[22] Filed: Jul. 22, 1982
[51] Int. Cl.³ ............................................. H04N 5/26
[52] U.S. Cl. .................................................... 358/227
[58] Field of Search ........................ 358/227, 165, 33; 307/550; 328/127, 128

[56] References Cited

U.S. PATENT DOCUMENTS 3,621,136 11/1971 Stanwood ........................... 358/227
3,883,689 5/1975 Mansour et al. ..................... 358/227
4,053,934 10/1977 Kornreich et al. ................. 358/227

Primary Examiner—John C. Martin
Assistant Examiner—Victor Kostak
Attorney, Agent, or Firm—Rines and Rines, Shapiro and Shapiro

[57] ABSTRACT

Electronic focusing for television pick-up cameras and the like is effected by removing video synchronization information and discontinuities from the video signal, bandpass filtering the sync-free video signal below television cut-off frequency, producing a current therefrom and rectifying to charge capacitance which is integrated into a voltage, and periodically discharging the voltage to indicate a measure of average value of amplitude of signal which is maximized to focus the camera lens.

10 Claims, 2 Drawing Figures

ELECTRONIC FOCUSING METHOD AND APPARATUS FOR TELEVISION PICK-UP CAMERAS AND THE LIKE

The present invention relates to electronic circuits for aiding the focusing of lenses associated with television pick-up cameras and the like.

It has previously been proposed to focus television camera lenses and the like by maximizing the highest frequency content of the image. Underlying the present invention is the discovery that more facile, accurate and simple focusing can be attained, void of the necessity for high frequency content processing, by processing the video signal to insure only video signal content, and appropriately band-passing the same at the television cut off frequency to provide a measure of the average value of amplitude of rectified and integrated current converted from the band pass voltage output, and maximizing that signal amplitude.

An object of the invention, accordingly, is to provide a new and improved method of and apparatus for automatic electronic focusing of television pick-up cameras and the like having the above and other advantages.

A further object is to provide a novel focusing apparatus of more general utility as well.

Other and further objects will be explained hereinafter and are more fully set forth in the appended claims.

In summary, however, from one of its viewpoints, the invention embraces a method of focusing a television pick-up camera and the like, that comprises, converting an optical image focused by a lens upon a pick-up camera into a corresponding television-like raster video signal; producing digital timing pulses; removing video synchronization information and discontinuities caused thereby from the video signal under the control of the timing pulses; passing the sync-free video signal through band pass filtering adjusted to have a relatively broad skirt and peaking steeply below the television signal cut-off frequency; converting the bandpass voltage output to a current and rectifying the same to develop a charging current into a capacitance that integrates the same to produce a voltage; periodically under the control of said timing pulses discharging said capacitance to indicate a measure of the average value of amplitude of signal; and varying the lens focusing to maximize signal amplitude to attain sharp focus. Preferred and best mode embodiments and details are hereinafter presented.

The invention will now be described with reference to the accompanying drawing, FIG. 1 of which is a block diagram illustrating the technique of the invention; and FIG. 2 is a circuit diagram of a preferred implementation of the apparatus of FIG. 1.

Figure 1:
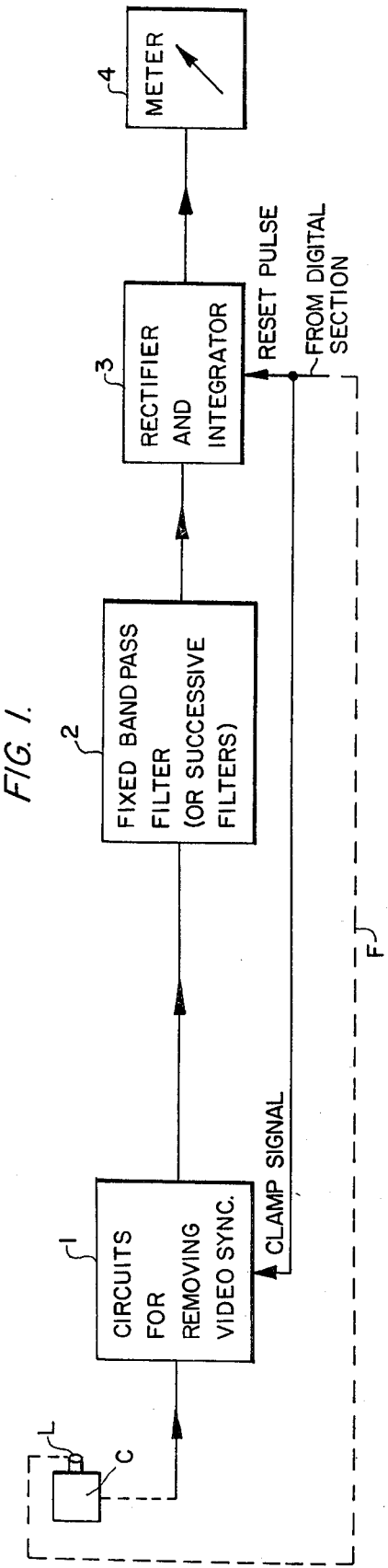

Referring to FIG. 1., the objects of the invention are achieved by first removing the retrace and composite synchronizing pulses S (sync) from the video signal V (FIG. 2) of the television raster type, fed from a television pick-up camera C or the like having a lens L optically focused upon the object being televised. This is effected by later-described appropriate circuits 1, under control from digital timing clamp signals, insuring tracking from zero at the start of the horizontal sweep line of the image by holding the base of the signal at ground through the composite sync. Only true variations in the actual image are then involved at V' (FIG. 2) and not discontinuities resulting from the sync. The sync-free video is then fed to a fixed bandpass filter 2 (or, if desired, successive higher-frequency band filters) having steep peaks P (FIG. 2) below (say 2.5 MHz) or at the television cut-off frequency of 5 MHz, with a sufficiently broad skirt below the cut-off down to about 500 KHz, for example. Above 2.5–5 MHz, there is little spacial information in the picture so that the filter should peak about 2.5 MHz. The output, changed to current, is rectified and integrated at 3, under control of timing signals from the digital section, providing a measure in the meter or other indicating circuit 4 of the average value of the amplitude of signal. The lens L can then be focused in accordance with the maximizing of the signal amplitude at 4 (schematically illustrated by the dotted link F) to attain sharp focus.

Illustrative circuits for performing the functions of FIG. 1 are shown in FIG. 2 wherein the sync-removing circuits 1 comprise an emitter-follower section 1' feeding the video input V to a source following 1", as of the FET type, subject to the control of a digital timing clamp signal (1/60 of a second, for example) from the digital section at the FET 1''', removing sync from the video by grounding when the FET is closed and opening as the video content commences. The sync-free video signal is illustrated by the waveform V', shown applied from the FET 1''' to an emitter follower 2' feeding a tuned amplifier 2" having a tuned circuit L-C in the collector lead adjusted to provide a fixed bandpass filter 2 as before described. The resulting voltage is converted in FET stage 5 by transformer T to a current that forces conduction of the diode R and causing integration in connection with capacitor C' in the rectifier-integrating section 3. The charged capacitor voltage is periodically discharged under the control of the digital timing reset pulses (every 1/60 seconds), with FET 6 applying through diodes D a signal that, in d.c. current meter 4, is a measure of the average value of amplitude of the signal.

While the lens L may be manually controlled as the observer peaks the meter reading at 4, this may also be automatically achieved by well-known motor drive responsive to peak signals, schematically represented by the loop F.

A successful system as shown in FIG. 2 operating with a IN914 diode rectifier R, a capacitor C' of 0.1 mfd and a shunt resistor there-across of 4.7 megohms, using a 500 uA d.c. current meter 4 produced focusing with a 2.5 mm type lens and a television camera of accuracy of 512 lines.

Further modifications will also occur to those skilled in this art, and such are considered to fall within the spirit and scope of the invention as defined in the appended claims.

What is claimed is:

1. A method of focusing a television pick-up camera and the like, that comprises, converting an optical image focused by a lens upon a pick-up camera into a corresponding television-like raster video signal; producing digital timing pulses; removing video synchronization information and discontinuities caused thereby from the video signal under the control of the timing pulses; passing the sync-free video signal through bandpass filtering adjusted to have a relatively broad skirt and peaking steeply below the television signal cut-off frequency; converting the bandpass voltage output to a current and rectifying the same to develop a current into a capacitance that integrates the same into a voltage periodically under the control of said timing pulses discharging said capacitance to indicate a measure of the average value of amplitude of signal; and varying the lens focusing to maximize signal amplitude to attain sharp focus.

2. A method as claimed in claim 1 and in which said cut-off frequency is set at below or about 5 MHz.

3. A method as claimed in claim 2 and in which said bandpass filtering is effected by a single bandpass filter peaked at a frequency below or about said 5 MHz.

4. A method as claimed in claim 1 and in which said bandpass filtering is effected by filters of successively higher bands.

5. A method as claimed in claim 1 and in which the said converted current is fed to force the breakdown of a diode rectifier to produce a charging current for said capacitance.

6. Focusing apparatus for a television pick-up camera and the like that generates a television raster type video signal as a lens optically focuses objects upon the camera, said apparatus having, in combination, means responsive to timing signals for removing video synchronization information and discontinuities caused thereby from the video signal; bandpass filter means connected to receive the sync-free video signal and to pass the same under filtering action peaking near the television cut-off frequency and passing a relatively broad band of frequencies; means for converting the filtered voltage to a current and applying the same to rectifying means to charge capacitive integrating means; means controlled by the timing signals for periodically discharging the charged capacitive means to provide a measure of the average value of amplitude of signal; and means for enabling varying of the lens focusing to maximize signal amplitude and thus attain sharp focus.

7. Focusing apparatus as claimed in claim 6 and in which said removing means comprises FET clamp-signal-responsive means for grounding out synchronizing signals.

8. Focusing apparatus as claimed in claim 6 and in which said current converting means comprises transformer means.

9. Focusing apparatus as claimed in claim 8 and in which said rectifying means comprises diode means conduction through which is forced by the transformer-produced current to charge the capacitive means.

10. Focusing apparatus as claimed in claim 6 and in which said timing signals are of the order of 1/60 second.

* * * * *